Feb. 16, 1926.
P. L. CLARK
1,572,989
APPARATUS FOR THE ELECTRICAL TRANSMISSION OF VISUAL IMAGES
Filed August 1, 1923   2 Sheets—Sheet 1
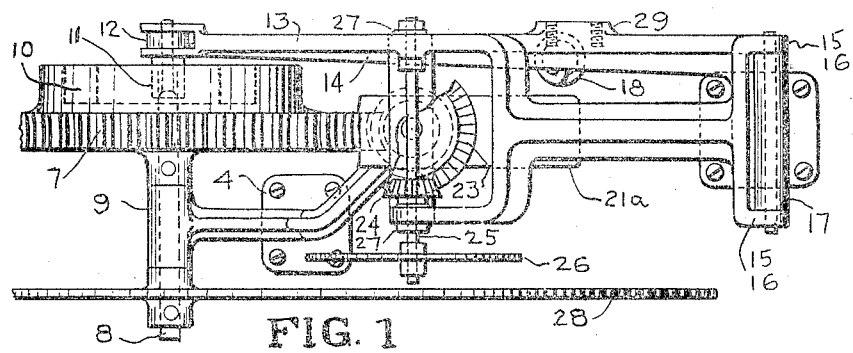
FIG. 1
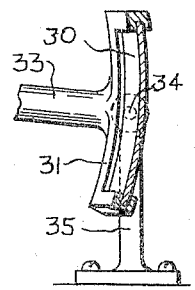
FIG. 3
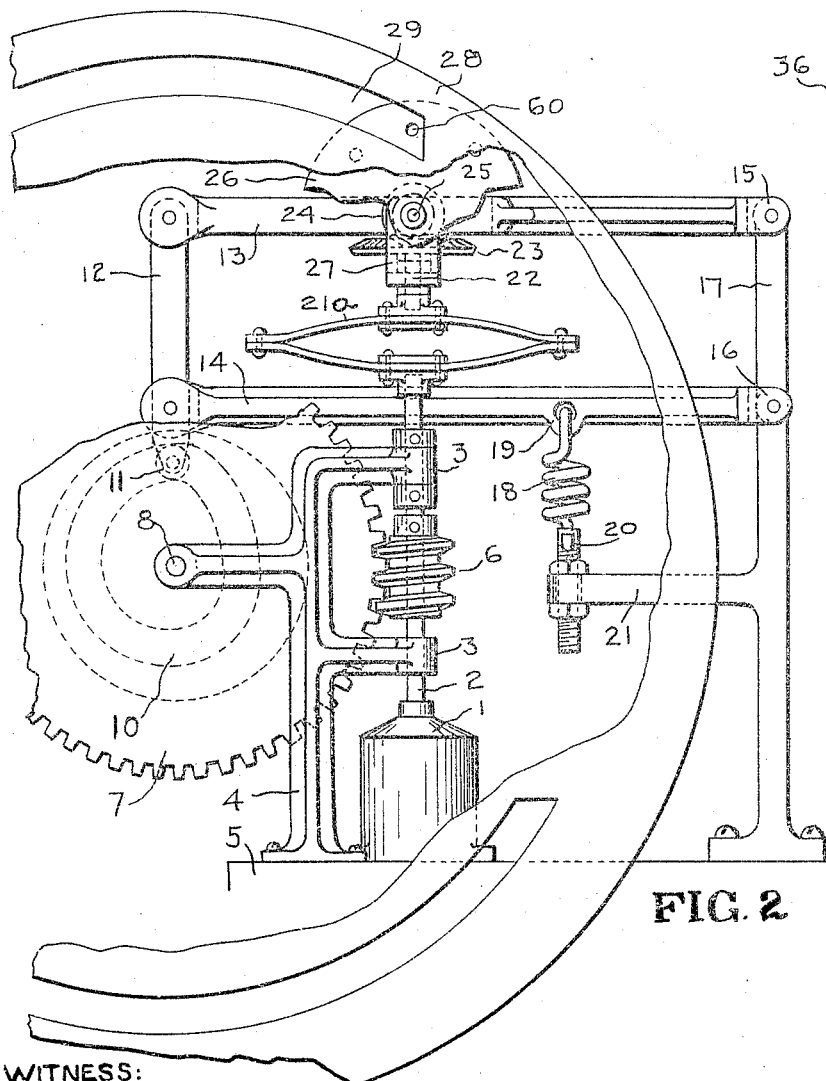
FIG. 2
FIG. 4
FIG. 5
WITNESS:
H. F. Clark
M. A. Gedded
INVENTOR
Paul L. Clark

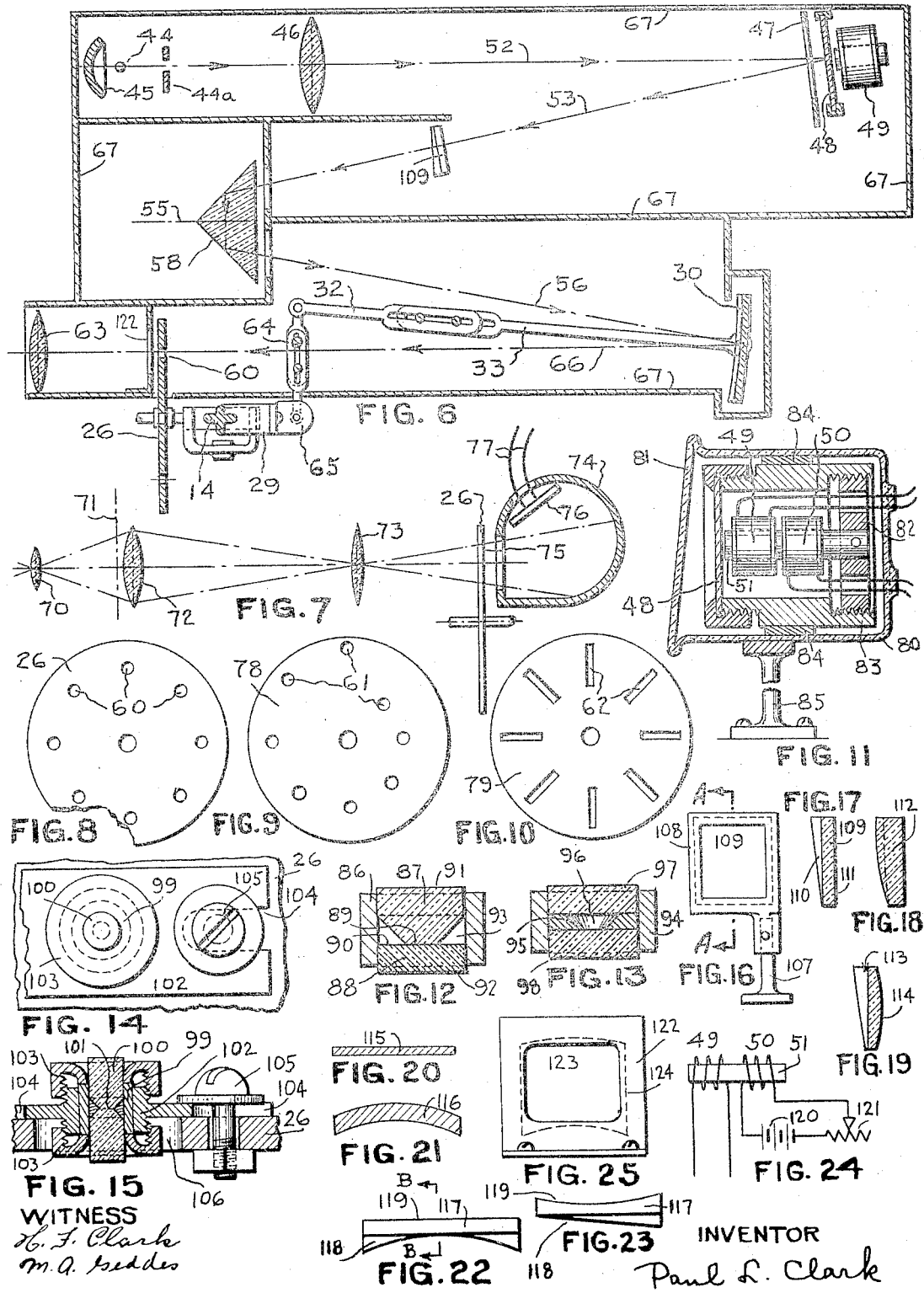

Patented Feb. 16, 1926.

1,572,989

UNITED STATES PATENT OFFICE.

PAUL L. CLARK, OF BROOKLYN, NEW YORK.

APPARATUS FOR THE ELECTRICAL TRANSMISSION OF VISUAL IMAGES.

Application filed August 1, 1923. Serial No. 655,027.

*To all whom it may concern:*

Be it known that I, PAUL L. CLARK, a citizen of the United States, residing at Brooklyn, in the county of Kings and State of New York, have invented new and useful Improvements in Apparatus for the Electrical Transmission of Visual Images, of which the following is a specification.

My invention relates to improvements in machines for the transmission and receiving of electrical or electro-magnetic impulses, either by wire or radio of point by point, line by line, or spot by spot, scenes at one location so that an image of the scenes may be produced upon a screen, lens or photographic plate for observation at a distant point or station; or for the transmission or reception, or both, of periodic or non-periodic waves or impulses produced by means of light waves or electrically, magnetically or otherwise; and the object of my invention is to provide a simple optical and mechanical arrangement for both or either the receiver and sending apparatus.

I attain these objects by the mechanism illustrated in the accompanying drawings in which—

Figure 1 is a plan view of part of the mechanism used for both or either the receiver and transmitter, showing parts of several of the members broken away, for clearness; Fig. 2 is a front elevation of Fig. 1, showing parts broken away; Fig. 3 is a sectional elevation of a concave mirror and rocker arm used in the receiver, as shown in Fig. 6; Fig. 4 is a cross-section and Fig. 5 is an end elevation of an element to be used in place of those shown in Figs. 12, 13, 14 and 15; Fig. 6 is a sectional elevation of part of the receiver, showing especially the detailed optical system; Fig. 7 is a sectional elevation of the optical system used in the transmitter; Figs. 8, 9 and 10 are front elevations of three types of revolving disks provided with suitable apertures, for use in both the receiver and transmitter; Fig. 11 is a cross-section of the device used for varying the strength or intensity of the light beam, as used in Fig. 6; Figs. 12 and 13 are cross-sections of elements to be employed in place of the perforations in the revolving disks; Figs. 14 and 15 are respectively a plan and a cross-section of the mounting for the elements shown in Figs. 4, 5, 12, 13; Fig. 16 is a front elevation of a frame enclosing a warped prism for changing the shape of the light beam; Fig. 17 is a cross-section on A—A, Fig. 16, showing the prism only; Figs. 18 and 19 are cross-sections showing modified types of prisms; Fig. 20 is a cross-section showing the shape of the light source or a slotted plate or aperture permitting passage of the rays from a light source such as an arc lamp; Fig. 21 is a cross-section showing the shape of the spot produced after refraction by a prism like that in Fig. 16; Fig. 22 is a plan view of a modified prism; Fig. 23 is a section on B—B, Fig. 22; Fig. 24 is a diagram showing a differentially wound electromagnet, such as used in Figs. 6 and 11; Fig. 25 is a front elevation of an aperture plate to be used in receiver or transmitter.

Similar numerals refer to similar parts throughout the several views, unless otherwise noted.

In Figs. 1 and 2 a motor 1 drives a spindle 2 passing through bearings 3 integral with standard 4 attached to a rigid base 5. A worm 6 is attached to spindle 2 and meshes with a worm gear 7 attached to a spindle 8 which runs in a bearing 9. Integral with the gear 7 is a cam 10 designed to give substantially uniform motion through a portion of its revolution to a follower 11 attached to arm 12 which is pivoted to the parallel members 13, 14 whose other ends are pivoted at 15, 16 to a vertical standard 17 attached to a base 5, so that as the motor revolves substantially uniform motion is secured in the members 13, 14. A coiled tension spring 18 passing through hole 19 in the member 14 and fastened to adjusting screw 20 in the arm 21 keeps the follower 11 against the cam 10. To the upper end of spindle 2 is attached a flexible coupling 21ª and to the coupling a spindle 22 driving a bevel gear 23 meshing with gear 24 attached to spindle 25 attached to disk 26, the spindle 25 passing through bearings 27 integral with the member 13, so that as the arm 13 is vertically reciprocated the disk 26 travels with it, meanwhile revolving rapidly, so that for each period of vertical reciprocation there are a great many turns imparted to the disk. An opaque shutter 28 having an aperture 29 of suitable width and registering with the uniform travel portion of the cam 10 is attached to spindle 8, the object of the shutter being to exclude the passage of light through the apertures in the disk 26 during the portion of the return stroke, being similar in function, for example, to shutters used on intermittent movement projection machines for moving pictures. A drilled boss 29 is provided on the arm 13 for attaching a link motion, shown in Fig. 6.

In Fig. 3 a concave mirror 30 held in a suitable frame 31 is rocked back and forth responsive to the motion of the member 13, Figs. 1, 2 and 6. An arm 33 is secured to frame 31, so that the mirror oscillates about spindle 34 supported by the adjustable pedestal 35. Other details of this mirror are described in connection with Fig. 6.

In Figs. 4 and 5 a lens barrel 36 carries convex lenses 37, 38, of short focal length, suitably and adjustably mounted in rings 39, 40 threaded into the barrel 36. Inside the barrel and also threaded is a ring 41 having an aperture 42 and covered by polished glass disks 43 cemented in place. Both lenses or either lens may be removed entirely or replaced by a piece of plane glass, if desired, for focusing or other purpose. The lenses being of short focal length should be focused substantially on the aperture or the plane of the aperture, for best results, although the adjustment permits of any desired focusing.

In Fig. 6 a light source 44 on the optical axis 52 is provided with a reflector 45 and casts light upon a convex lens 46 which directs them in a converging beam to fall upon a diaphragm 48 actuated by an electromagnet 49, causing an image or out-of-focus image of the source to register at or near the axial plane 55 of the prism 58, or at the prism 109, or somewhere between the diaphragm 48 and the mirror 30—preferably, half way. The rays 56 emerging from the prism 58 are gathered by the mirror 30 and converged to focus upon or near the aperture 60 of the blackened disk 26, so that as impulses of varying strength are received in the electro-magnetic circuit, the light falls with varying intensity upon the apertures 60, and so that a strong impulse produces a concentrated and intense spot at 60 and no impulse or a feeble impulse produces a relatively dull and scattered light at 60. As the disk 26 revolves adjacent, successive, eccentric or concentric bands are traced upon the field of view and the projection lens 63 projects to a screen (not shown) an image of the light as it appears at the plane of the disk 26. The diameter of the apertures 60 depends upon the sharpness of delineation required, and the number of successive arcs traced by the disk during its movement through a specified vertical distance; and it may be stated that—

$$d = \frac{a}{rp}, \text{where—}$$

$d$=diameter of aperture.
$a$=specified vertical movement of disk (amplitude).
$r$=number of revolutions of disk during the movement $a$, (the number of revolutions during exposure depending upon the design of the cam 10 and the clear arc and position of the shutter 8, Figs. 1 and 2).
$p$=number of apertures per disk.

The actual size of the apertures used in practice may be larger or smaller than those determined by the above formula. The proportion of time available during each cycle depends upon the design of the cam 10 and the shutter 28. The mirror 30 should, for sharpest images, be ground spherical or elliptical with one focus at a distance equal the lengths of the path from its center to the intersection of the ray with the plane 55 of the prism 58 or the prism 109 (or otherwise as determined by the optical requirements), and the focus conjugate at or near the plane of the disk 26 and near the aperture 60. It should be understood that the position, angle of inclination, amplitude of oscillation or other necessary adjustments of the mirror 30 and its supporting means should be provided in order to secure the necessary degree of precision in focusing. Also the sizes, design, spacing, dimensions, speed, proportions and arrangement of the various factors, elements or parts going to make up a complete outfit shown in this specification may be determined by experiment or in accordance with optical, mathematical, mechanical, electrical, physical or other scientific or basic principles governing the design, use, operation and maintenance of apparatus of the character herein described. Adjustable links 32, 33, 64 attached to the member 65 by means of universal or ball joints—the member 65 being bolted to the boss 29 on the arm 14 (see Fig. 1)— permit of adjusting the oscillation, amplitude and position of the mirror 30, so that as the disk 26 moves up and down, the light beam reflected from 30 follows the approximate line of travel of the apertures, the arc of travel of the mirror being about half the angle between the lines 56 and 66, the boss 29 being so positioned, in cooperation with the link motion as to secure this result. Varying the distance between the mirror and the revolving disk gives control of the position, height and width of the spot, and when lens units are used such as shown in Figs. 4, 5, 12, 13, 14 and 15, the lens aperture should be such as to receive the full height or width of the band of light for the condition of maximum concentration, in order to utilize a fair proportion of the light transmitted. It should also be understood that a certain flexibility in focusing is obtainable through the medium of the lens 46, the prism 109, the prism 58, etc., since all parts of the apparatus are adjustable in regard to focal distances, position, angles, etc. Suitable blackened partitions and light-tight housing 67 are shown, enclosing and dividing the apparatus. The lens 63 corresponds to lens 73, Fig. 7, except that one lens receives the rays from the view whereas the other lens throws the view to the screen. An aperture plate 122 (see Fig. 25) is provided between the disk and the lens 63.

In Fig. 7 a lens 70 receives rays from the view to be transmitted and refracts the rays to focus upon a plane 71. Beyond, or in this plane is placed a large diameter lens 72 of comparatively short focal length, which refracts the rays to fall upon a lens 73 of comparatively long focal length, the latter lens being so placed that one focus lies substantially in the plane 71 whereas the focus conjugate lies in the plane of the disk 26, producing at 26 an image smaller than that received upon the plane 71. It should be stated that the lenses 70 and 72 are used only for a certain short focal length requirement, and these two lenses may be dispensed with for long focal length transmission. The rays passing through the apertures in the disk 26 enter the light box 74, painted white inside or lined with uniformly-distributing specular material of the types described in applicant's Patents 1,122.192; 1,279,262, and his pending application, Serial Number 406,-382. Also the back surface 75 of the disk 26 should be painted white or formed of other reflection screen material, the object being to enclose all light entering the box 74 so as to produce an even illumination on the selenium cell 76, whose leads 77, with suitable auxiliaries, are connected to a broadcasting radio or wire circuit through amplifiers and auxiliaries (not shown) in the place of the usual microphone transmitter and its auxiliaries, as used in audio broadcasting.

In Fig. 8 the opaque disk 26 is provided with a plurality of equi-spaced, equal apertures 60, designed as described in connection with Fig. 6, all the apertures being preferably equidistant from the centre of the disk, the apertures being transparent to permit the passage of light rays through them.

In Fig. 9 the apertures 61 on the disk 78 are arranged on a spiral, each aperture being nearer to the centre of the disk than the preceding one by approximately its diameter. The apertures may be placed either chord lengths apart or at equal angles, or as desired, it being understood that the same type of disk should generally be used in both receiver and transmitter. The use of a disk such as here shown will obviate the use of the oscillating mechanism shown in Figs. 1 and 2, since the apertures are arranged to cover the entire field of view.

In Fig. 10 slots 62 in the disk 79 are radial, equispaced and of equal size. This disk used in place of the disk 78, Fig. 9, will give less definition unless sharpness be secured by means of a mathematically perfect mirror, light source and optical train, such as shown in Fig. 6. The length of the slots 62 should be enough to include the height of the image of the projected view, while the spacing of slots (and the same holds true of the spacing of apertures and the amplitude of the disk 26, Figs. 1, 2, etc.) should be such as to give the proper width to the view. The approximate outline of the view transmitted and secured is shown by the dotted lines in Fig. 25, it being seen that the successive spots or points follow each other in rapid succession across the field of view, one spot at a time, each aperture transmitting or simultaneously receiving a line or arc of light comprising the point by point values, the next aperture repeating the operation for the next line of view, as understood by those familiar with the art, and as described in my pending application, Ser. No. 627,815.

In Fig. 11 electro-magnet coils 49, 50 on the core 51 are suitably mounted in an evacuated chamber 80 having a clear glass plate 81 (which may be removable if desired) in front of the diaphragm 48. Adjustment for varying the gap between the magnet and the diaphragm may be made by turning the threaded member 82 in the shell 83 which is held inside the chamber 80 by the ring or wedges 84. The magnet coils 49, 50 are preferably of opposite polarity, as described in connection with Fig. 24. The chamber 84 is attached to an adjustable support 85, enabling it to be placed in any desired position.

In Fig. 12 a metal ring 86 contains glass disks 87, 88, with the surfaces 89, 90 contacting or cemented together with transparent cement. One end 89 of the disk 87 is ground off and polished like the frustrum of a cone, the diameter of the circle comprising this end being equal to that required for the aperture, such as 60, Fig. 8. Any one or more of the outside surfaces 91, 92 or the inside surfaces 89, 90 may be concaved or convexed to perform focusing functions either to or from the aperture space, as represented by the surface 89. The space 93 may be filled with opaque cement.

In Fig. 13 a metal ring 94 retains an opaque disk 95 having a tapered hole 96 of the proper aperture size. On each side of the disk 95 is a clear glass disk 97, 98, the three disks being cemented or otherwise held in place in the ring 94. Any one or more of the refracting faces of the disks 97, 98 may be curved, if desired, spherically, cylindrically, or otherwise, in order to focus the light passing through the aperture; and the relative diameters of the aperture opening and the glass disks may be as desired, in order to secure an intense spot at the aperture regardless of the undesirable but frequently unavoidable scattering of the rays due to optical and light source defects. It will generally be found sufficient to provide one focusing member only, i. e., one glass disk nearest the mirror 30, Fig. 6, so that the scattered rays entering the large diameter lens, as 97, will be focused around the area occupied by the aperture 96. A similar arrangement is shown in Figs. 4 and 5. The complete elements shown in both Figs. 12 and 13 may be used in place of the element 99, 100, Fig. 15. Lenses or prisms shown as single units in this specification may obviously each be composed of a plurality of separate elements so as to avoid chromatic aberration and distortion and permit of accuracy and flexibility in focusing or otherwise refracting or reflecting the light rays.

In Figs. 14 and 15 a glass cylinder 100 is ground of smaller diameter at 101 to give the desired aperture opening, the cylinder being cemented into a metal ring 99 having a sliding fit in the member 102. Caps 103 screwed to the member 102 and bearing on the ends of the ring 99 give longitudinal adjustment of the aperture disk with respect to the member 102. Slots 104 in the member 102 permit transverse adjustment of member 102 with respect to the disk 26, the member 102 being bolted to the opaque disk by suitable bolts 105. Either end of the cylinder 100 may be convexed to form a converging lens of proper focal length to concentrate the rays upon the aperture, as described in connection with Figs. 12 and 13. An opening 106 in the disk 26 is large enough to permit proper clearance for adjustment, the member 102 being of sufficient width to cover the opening 106 to prevent rays passing through undesirable areas. Instead of using a metal disk it is possible to employ a glass disk either painted or electro-plated, and provide the necessary apertures, lens surfaces or other refractors directly on the disk itself, in order to lessen the number of units and simplify construction. Revolving disks showing lens units and apparatus embodying features similar to those shown in Fig. 6 are shown and claimed in my copending application S. N. 77,020; and apparatus using aperture plates as shown in Fig. 23 are shown in Figs. 1 and 5 of S. N. 715,350, in Figs. 2, 30 and 31 of S. N. 13,306, and in Figs. 3, 4 and 9 of S. N. 627,815.

In Figs. 16 and 17 a support 107 carries a frame 108 enclosing a refractor 109 having a flat face 111 and a warped face 110, the function of the warped face being to distort the paths of some or all of the rays that pass through the prism to produce a spot somewhat like that shown in Fig. 21. The location of refractor 109 is shown in Fig. 6 between the diaphragm 48 and the prism 58, although it may also be used between the disk 26 and the lens 63, Fig. 6, or between the lens 70 and plane 71, Fig. 7, to give substantially rectangular shape to the field of view for transmission and observation. A prism having a warped surface as here shown, i. e., as generated by a straight or curved line one end of which moves in a straight line and the other end on the path of a circle or other curve, will cause the rays striking near its sides to be refracted vertically as well as sidewise, while those passing through the central plane will not materially change their direction.

In Fig. 18 the refractor 112 is part of a plano-convex lens which produces the necessary warping of a straight image to produce a curved image, or vice versa. This refractor may be used in place of the refractor 109, Figs. 6, 16, 17, if desired. Also the refractor shown in Figs. 22 and 23 may be so used.

In Fig. 19 the refractor 113 is the same as that shown in Fig. 17, except that it has a convex face 114, ground and polished elliptical, cylindrical or spherical, in order to secure the necessary refraction of the rays.

In Fig. 20 the shape of the spot, aperture or light source 115 is long and narrow. Since only a narrow band of light is required to illuminate the apertures and in order to reduce the amount of heat and waste of energy, it will be found advantageous to use a straight or curved lamp filament or illuminated aperture for the light source. An adjustable aperture plate similar to that shown in Fig. 9 of my application Ser. No. 627,815 may be used to obtain either the straight shape 115 or a thin curved arc, it being understood that a source of adequate size should be placed behind the plate to evenly and fully illuminate the plate and aperture, so that all of the desirably reflecting part of the diaphragm 48, Fig. 6, shall be illuminated.

In Fig. 21 the shape of the spot is curved to follow the shape of the path traced by an aperture in the disk 26, while said aperture is crossing the field of view. The spot 116 will be narrow when the diaphragm 48, Fig. 6, concentrates the rays to a substantial focus, and widen out as the convexity of the diaphragm causes the rays to scatter, depending upon the strength or frequency, or both, of the electro-magnetic impulses. The shape of the aperture plate opening, as shown in Fig. 20, or of the light source, may also approximate that shown in Fig. 21, thereby obviating the use of refractors such as shown in Figs. 17 and 18.

In Figs. 22 and 23 the refractor 117 has a warped front face 118 and a concaved back face 119. This refractor may be used in place of the refractor 109, Fig. 6, by so placing the various elements of the apparatus as to have it about midway in the light path between the diaphragm 48 and mirror 30, in which case the rays would not focus upon the plane 55 of the prism 58, but should, for accurate results, focus substantially upon the concave face of the prism. The same condition also applies to the convex prism 112, Fig. 18. The function of the curved faces is to produce a widening out of the beam to insure completely covering the apertures in the disk 26, Fig. 6, even for conditions of maximum brilliance, i. e., when perfect focusing is accomplished. The face 119 may be either concave or convex, as desired, and of cylindrical, spherical or other curvature. It is also possible to use reflectors and mirrors in place of refractors and lenses, the objects of the present invention being merely to provide the necessary means for accomplishing the required results.

In Fig. 24 the core 51 is wound with one winding 49 whose terminals are for connection with the circuit of the amplified received impulses, i. e., the coil should be connected into the radio receiving circuit (not shown) in the same manner as a radio telephone receiver coil is connected in an audio circuit. A second coil 50 is wound or connected to produce an opposite polarity to that of the coil 49. Coil 50 is connected through a battery 120 and an adjustable resistance or other current modifying device 121, in order to obtain an exact, or approximate, counterbalance for the maximum magnetizing effect of coil 49, so that with a maximum magnetizing current in coil 49 the effect of the differentially wound electromagnet on the diaphragm 48 is substantially zero. The diaphragm 48, Fig. 6, is preferably made of iron, or is connected to an iron diaphragm, and is normally plane and polished, being silvered, although a glass mirror may be used, if desired, by properly attaching the same to an electrically controlled means responsive to current or voltage fluctuations in the radio circuit. The use of this differentially wound magnet will give a brilliantly focused spot when a strong radio impulse is received and duller spots for weaker impulses.

In Fig. 25 the aperture plate 122 is of opaque material having an aperture 123 of the proper shape of the outline of the field of view.

Independent means for revolving the mechanism controlled by the receiver motor, as shown in applicant's pending application, Ser. No. 627,815, may be provided in order to change the point of view, at will.

I claim:

1. In an apparatus for the transmission of visual images, a transmitter comprising optical means for focusing the image of the device to be transmitted upon a given focal plane, an opaque disk having uniformly spaced light-transmitting apertures of equal area in said focal plane and equidistant from the axis of said disk, means for simultaneously rotating and vertically reciprocating said disk in said focal plane, each of said apertures traversing successive adjacent arcs of the view to be transmitted, and a light sensitive cell disposed to receive the rays passing through the apertures in said disk.

2. In apparatus for the transmission of visual images, a rotatable disk having apertures in the optical plane of the said images, said apertures being uniformly spaced apart and at a uniform distance from the axis of said disk, each of said apertures traversing one or more of a plurality of adjacent arcuate areas of the said focal plane of the view to be transmitted, and means for vertically reciprocating and simultaneously rotating said disk in said optical plane.

3. In apparatus for the transmission of a visual image of given width and height, a rotatable disk in the optical plane of said image, said disk being provided with a plurality of light-transmitting apertures of equal area uniformly spaced apart and at a uniform distance from the axis of said disk, each of said apertures traversing one or more of a plurality of arcuate adjacent areas in the focal plane of the image to be sent, means for vertically reciprocating at a uniform velocity and simultaneously rotating said disk at a relatively high velocity and at uniform speed, in said optical plane, and photo-electric means disposed to receive rays passing through said apertures.

4. In an apparatus for the transmission or reception of visual images, a rotatable disk provided with a plurality of apertures, means for vertically reciprocating said disk at a substantially uniform velocity, an opaque shutter provided with an aperture cooperating with the said disk to expose the apertures in said disk during a given period of vertical reciprocation, substantially as described.

In testimony whereof, I, PAUL L. CLARK, have signed my name to this specification this 30th day of July, 1923.

PAUL L. CLARK.